United States Patent
Diegel et al.

(10) Patent No.: US 8,107,615 B2
(45) Date of Patent: Jan. 31, 2012

(54) METHOD AND DEVICE FOR CHECKING THE FUNCTION FOR INVERTING THE POLARITY ON A SUBSCRIBER LINE COMPRISING A PLURALITY OF WIRES

(75) Inventors: Heike Diegel, Iffeldorf (DE); Rudolf Dollinger, München (DE); Roland Krimmer, Germering (DE); Bernhard Sieben, Neuried (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 932 days.

(21) Appl. No.: 12/088,063

(22) PCT Filed: Sep. 18, 2006

(86) PCT No.: PCT/EP2006/066463
§ 371 (c)(1),
(2), (4) Date: May 13, 2008

(87) PCT Pub. No.: WO2007/036450
PCT Pub. Date: Apr. 5, 2007

(65) Prior Publication Data
US 2008/0253534 A1  Oct. 16, 2008

(30) Foreign Application Priority Data
Sep. 28, 2005 (DE) .......... 10 2005 046 383

(51) Int. Cl.
*H04M 1/00* (2006.01)
(52) U.S. Cl. ........... 379/382; 379/26.01; 379/29.01; 379/29.03

(58) Field of Classification Search ........... 379/29.03, 379/26.01, 29.01, 27.01, 27.06, 29.04, 27.03, 379/377, 382
See application file for complete search history.

(56) References Cited

U.S. PATENT DOCUMENTS

| 4,843,620 | A | 6/1989 | Hagedorn |
| 5,943,419 | A * | 8/1999 | Okamoto ............ 379/382 |
| 5,970,099 | A | 10/1999 | Zhou |
| 6,810,112 | B1 | 10/2004 | Eguchi et al. |
| 7,548,515 | B2 * | 6/2009 | Walsh ............ 370/241 |
| 7,907,720 | B2 * | 3/2011 | Lantoine et al. ........ 379/385 |
| 2002/0090080 | A1 * | 7/2002 | Tiernan ............ 379/412 |
| 2002/0122538 | A1 * | 9/2002 | Ludeman ............ 379/27.01 |

FOREIGN PATENT DOCUMENTS
WO  WO 2004/086738 A2  10/2004
WO  WO-2004086738 A2  10/2004

* cited by examiner

*Primary Examiner* — Olisa Anwah
(74) *Attorney, Agent, or Firm* — Laurence A. Greenberg; Werner H. Stemer; Ralph E. Locher

(57) ABSTRACT

The invention relates to a method and to a device for testing the function for inverting the polarity on a subscriber connection line (TAL) comprising several wires (a, b), in order to connect at least one subscriber to a subscriber connection line (SLM), which comprises at least one inverting device (RG) and a current measuring device (MG) which is associated with the inverting device (RG). In a first step, the subscriber connection component (SLM) is separated from the inverting device (RG) and forces physical inversion on the wires (a, b) of the subscriber connection line (TAL). In a second step, the inverting function of the inverting device (RG) is activated. In a subsequent third step, the subscriber connection component (SLM) is separated from the device (DC) which forces the physical inversion and is connected to the inverting device (RG). The correct function of inversion is tested during all three steps by measuring the direction of the current flow.

10 Claims, 2 Drawing Sheets

METHOD AND DEVICE FOR CHECKING THE FUNCTION FOR INVERTING THE POLARITY ON A SUBSCRIBER LINE COMPRISING A PLURALITY OF WIRES

CLAIM FOR PRIORITY

This application is a national stage application of PCT/EP2006/066463, filed Sep. 18, 2006, which claims the benefit of priority to German Application No. 10 2005 046 383.5, filed Sep. 28, 2005, the contents of which hereby incorporated by reference.

TECHNICAL FIELD OF THE INVENTION

The invention relates to a method and a device for checking the function for inverting the polarity on a subscriber line, including a plurality of wires, for connecting at least one subscriber to at least one subscriber line interface circuit.

BACKGROUND OF THE INVENTION

The operators of communication networks, such as the conventional telephone network, provide the subscribers or their customers not only with the transmission of useful data (in the telephone network: the voice) but often also with a multiplicity of further complex services or subscriber service features. These services include conference calls, the transmission or suppression of telephone numbers, call forwarding or the metering pulse, for example.

To provide these extensive services, the subscriber line module (SLM) needs to comprise various functions. One of these functions is what is known as the "reversal" function or inversion function, that is to say the possibility of reversing the polarity on the usually two wires (a and b) of a subscriber line. This function is used for transmitting a metering pulse, for example.

A communication network's subscriber line module is usually arranged at the exchange end. In addition, it usually comprises two units per connected subscriber, the subscriber line interface circuit (SLIC) and the encoder/decoder, known as the CODEC.

In this case, the subscriber line interface circuit is the direct exchange-end access point for the subscriber line. The two wires of the subscriber line are physically connected to the subscriber line interface circuit and are supplied with the signals required for transmitting the useful data by it. The subscriber line is usually a conventional, commonly known twisted copper pair.

The CODEC converts the analog signals from the subscriber end into digital signals which are sent from the exchange and onward via the communication network. Similarly, digital signals coming from the exchange are converted into analog signals and are forwarded to the subscriber line interface circuit.

The CODEC usually accommodates additional further elements. Thus, the CODEC contains what is known as a reversal generator, for example. This is responsible for implementing the reversal function, that is to say for reversing or inverting the polarity at the subscriber end.

When inspecting the "reversal" function of the subscriber line module, it is necessary to check, inter alia, whether the subscriber line module actually provides inverted polarities on the wires of the subscriber line when the reversal function has been activated.

In conventional methods which can be attributed to the prior art, this check is performed using an external measuring instrument. In this case, the reversal function is activated and the measuring instrument connected to the subscriber line is used to check whether the polarity on the wires actually changes.

One drawback of such a solution, inter alia, is the need for the external measuring equipment described above, however, which needs to be operated appropriately by additional personnel.

SUMMARY OF THE INVENTION

In one embodiment of the invention, there is a method for checking the function for inverting the polarity on a subscriber line, including a plurality of wires, for connecting at least one subscriber to a subscriber line module which comprises at least one inversion device and a current measuring device associated with the inversion device. In line with the invention, the subscriber line is at least partially isolated from the deactivated inversion device, the polarity on the subscriber line is inverted using a connected direct current source, and the current measuring device is used to ascertain a first item of information representing the present direction of current flow on the subscriber line. Next, the inversion device is activated and the current measuring device is used to ascertain a second item of information representing the present direction of current flow on the subscriber line. Finally, the direct current source is isolated from the subscriber line, the subscriber line is connected to the activated inversion device, and the current measuring device is used to ascertain a third item of information representing the present direction of current flow on the subscriber line. To conclude, the ascertained first, second and third items of information are used to check that the inversion is functioning.

One advantage of the invention is that external measuring equipment and the associated additional personnel and financial involvement are avoided.

Advantageously, comparison of the ascertained first and the ascertained second item of information checks that the logical reversal of the internal current direction is functioning correctly in the subscriber line module.

Comparison of the ascertained second and the ascertained third item of information advantageously checks the proper inversion of the polarity on the wires of the subscriber line by the inversion device.

BRIEF DESCRIPTION OF THE DRAWINGS

The invention is explained in more detail below with reference to the appended drawings.

The drawings show the schematic design of a subscriber line module arranged in a communication network in general form in a block diagram. In particular.

DETAILED DESCRIPTION OF THE INVENTION

The text below describes the schematic design of a subscriber line module in a conventional communication network for performing the invention with reference to FIGS. 1, 2 and 3.

In this example, a test impedance I has been connected between two wires a and b of a subscriber line TAL at the exchange end (not shown). When this test impedance I is switched in, the subscriber is simultaneously isolated from the exchange, which prevents any disruption to the subscriber during the check.

The subscriber line TAL is connected to a subscriber line interface circuit SLIC, which in turn represents the interface to an encoder/decoder CODEC at the exchange (not shown).

The CODEC comprises a respective analog/digital converter $AD_a$, $AD_b$ for each of the wires a, b of the subscriber line TAL and an inversion device ("reversal generator"—RG), a direct current source ("DC generator"—DC) and a measuring instrument MG.

The inversion device RG can be switched to a plurality of states —"Inversion Off", "Inversion On". In the "Inversion Off" state, the inversion device RG outputs a negative voltage (−) to the a wire of the subscriber line TAL via the analog/digital converters $AD_a$, $AD_b$ of the CODEC and via the SLIC. Accordingly, the b wire is supplied with the positive voltage (+) in the same state. When the inversion has been activated ("Inversion On"), the a wire is accordingly supplied with a positive voltage (+), whereas the b wire is supplied with a negative voltage (−).

Figure 1:
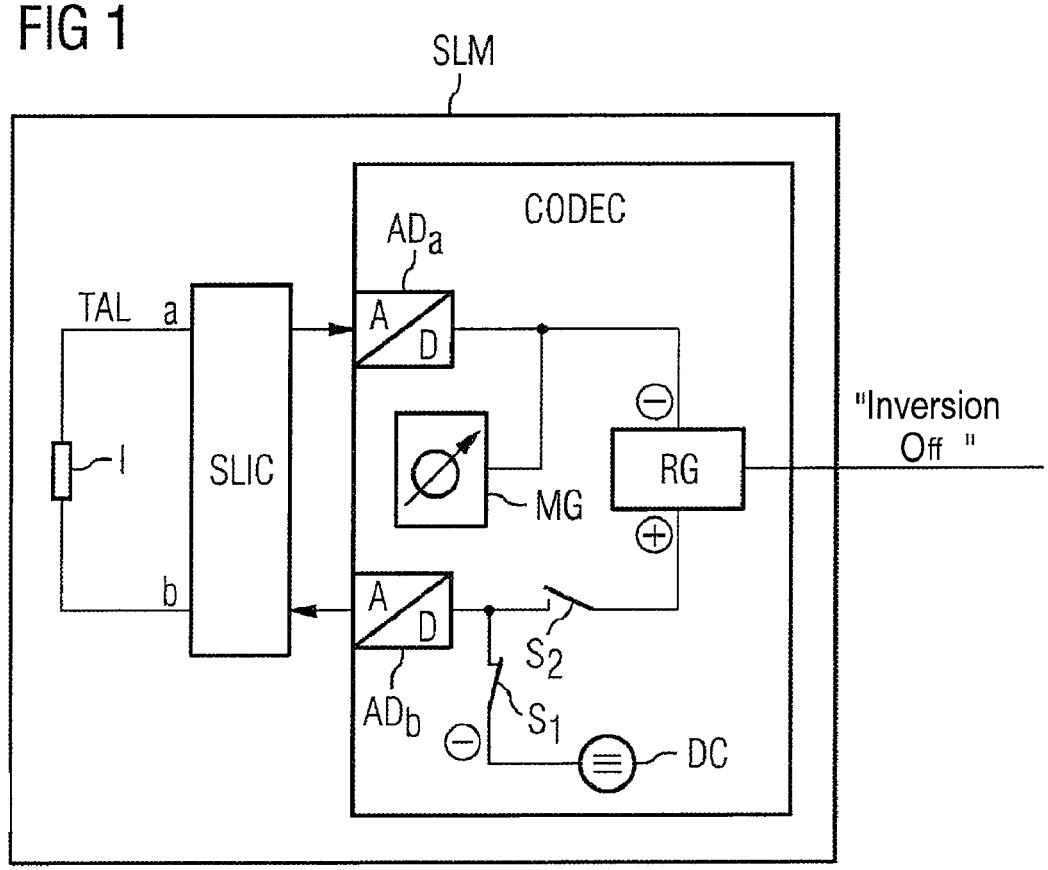
FIG. 1 shows an arrangement scenario when performing a first section of the invention.
Figure 2:
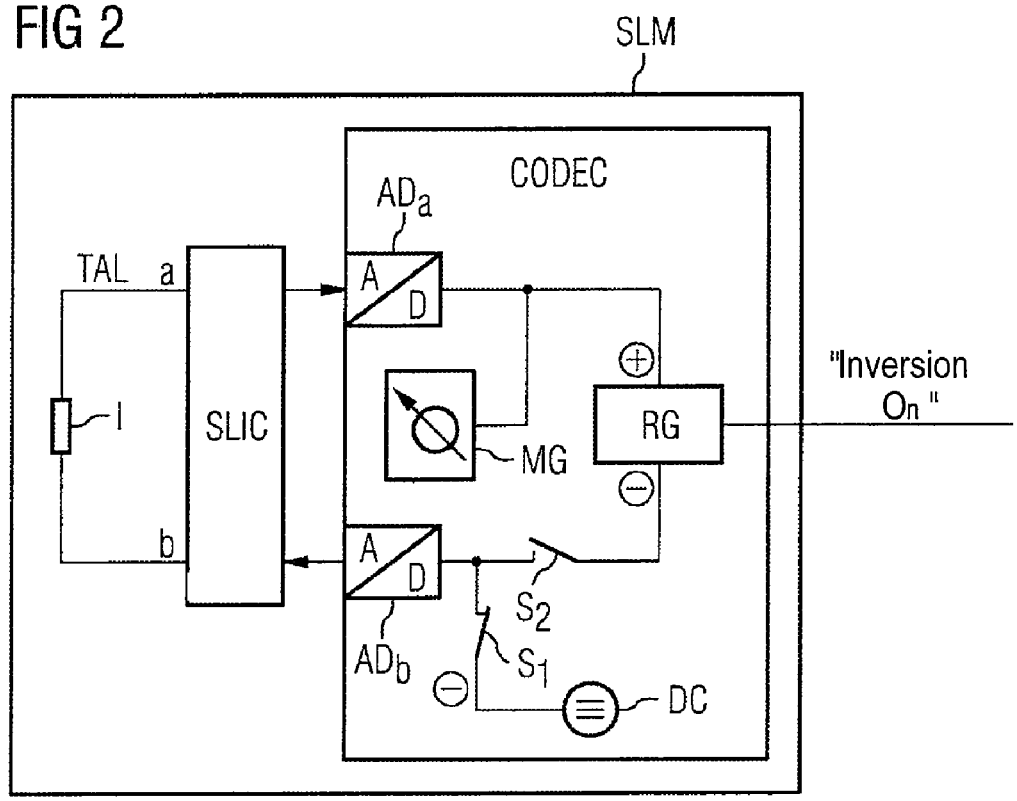
FIG. 2 shows an arrangement scenario when performing a second section of the invention.
Figure 3:
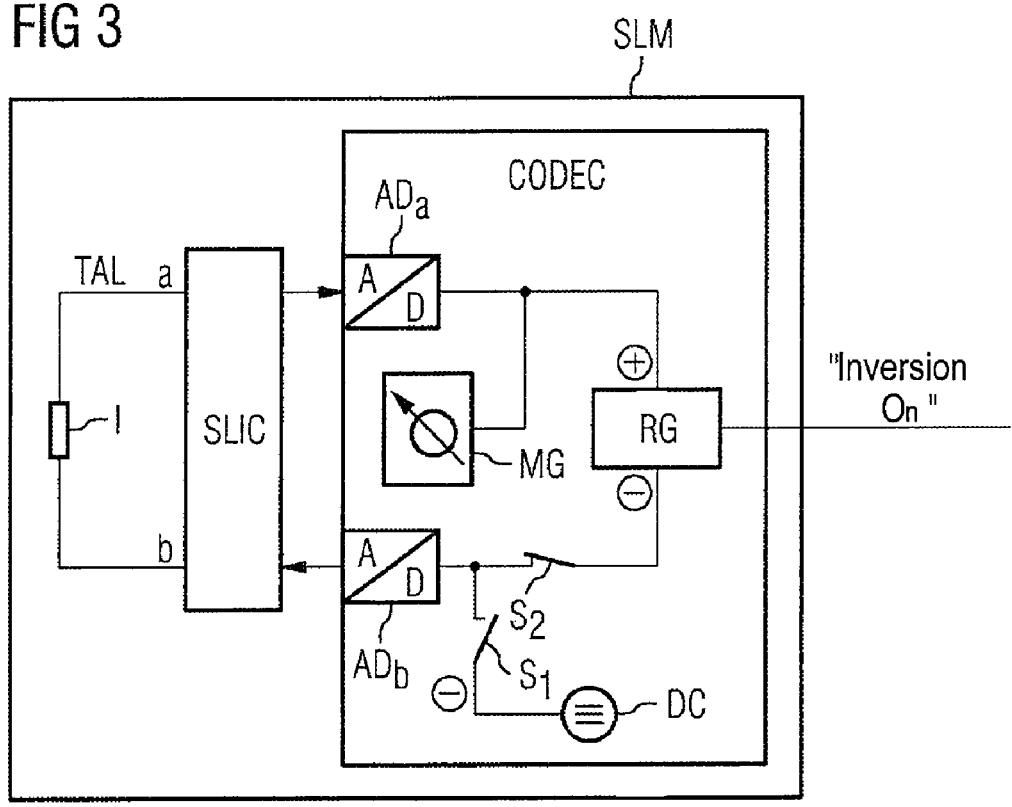
FIG. 3 shows an arrangement scenario when performing a third section of the invention.

In the exemplary embodiment shown in FIGS. 1, 2 and 3, the direct current source DC is connected to the b-wire side of the SLIC via a first switch S1 and via the analog/digital converter $AD_b$.

In the case of the following exemplary embodiment of the inventive method, the SLIC is decoupled from the CODEC's inversion device RG in a first section (FIG. 1). To this end, a switch S2 is opened which decouples an input of the inversion device RG from the b wire of the subscriber line TAL. Next, the SLIC is used to enforce a physical inversion of the polarity on the two wires a and b of the subscriber line TAL. This is done, as FIG. 1 shows, by switching in the digital direct current source DC, arranged on the CODEC, on that side of the SLIC to which the b wire of the subscriber line TAL is connected —closing the switch S1.

Although the CODEC's inversion device RG has been decoupled from the SLIC in the first method section (FIG. 1), its state must continue to be prescribed (in this case: "Inversion Off"). The reason for this is that numerous present and also future subscriber line modules also logically reverse the internal current direction, in addition to the actual reversal of the polarity on the subscriber line TAL, when the inversion has been activated. Logical reversal can be effected, by way of example, by virtue of all the components (MG, $AD_a$, $AD_b$) arranged on the subscriber line module SLM receiving a piece of information about the activation of the inversion device RG. In this case, the components orient themselves according to the new, inverted current direction, i.e. the polarities of the internal indicator and measuring devices may be interchanged, for example.

To be able to correctly indicate the current direction on the wires (a, b) when taking measurements using an internal measuring instrument MG, the state of the inversion device RG (Inversion On/Off) also needs to be prescribed and known in the state in which it is decoupled from the subscriber line TAL.

If the direct current source DC, as can be seen in FIG. 1, is finally connected to the b-wire side of the subscriber line TAL via the closed first switch S1, the measuring instrument MG arranged on the CODEC is used to determine the polarity and hence the direction of flow of the current on the subscriber line TAL.

In a second method section of the inventive method (FIG. 2), the state of the inversion device RG is set to "active". That is to say that in the CODEC the inversion and hence also the logical reversal function are activated.

Since the inversion device RG continues to remain decoupled from the connection to the SLIC (S2 open) and the direct current source DC continues to be connected to the appropriate analog/digital converter (S1 closed), the polarity on the a and b wires of the subscriber line TAL does not change.

The change in the internal current direction as a result of the activation of the reversal function means that the measuring instrument MG must indicate that the polarity of the current value on the subscriber line TAL has been reversed when a fresh current measurement is taken in section 2 of the inventive method and the logical inversion by the CODEC is functioning correctly, however.

Thus, if the current direction indicated by the measuring instrument MG during the second current measurement changes in comparison with the previously ascertained current direction, this means that it is possible to infer that the logical reversal of the internal current direction is functioning correctly in the subscriber line module SLM. If it is not possible to establish any change in the indicated current direction, however, it must be assumed that there is a fault in the reversal of the internal current direction.

Finally, in a third method section of the inventive method, the direct current source DC is isolated from the b side of the SLIC (switch S1 open), and the SLIC is coupled to the inversion device RG again (S2 closed). The connection between the inversion device RG and the subscriber line TAL is thus restored.

In this case, the inversion device RG is left in the "Inversion On" state. The internal, logical current direction in the CODEC accordingly remains the same in section 3 as in section 2.

In conclusion, the measuring instrument MG is again used to ascertain the direction of current flow on the subscriber line TAL by means of current measurement.

If the direction of current flow indicated by the measuring instrument MG does not change in comparison with the last measurement in section 2, this shows that the inversion device RG actually produces an inversion of the polarity on the wires a and b of the subscriber line TAL in the "Inversion On" state. If, in the opposite case, however, no change of current direction is indicated by the measuring instrument MG, it must be assumed that the inversion device is functioning incorrectly in terms of the actual inversion of the polarity.

The invention can therefore perform various examinations in checking the function for inverting the polarity on a subscriber line in a communication network. Thus, by performing all three method sections mentioned above, it is firstly possible to establish whether the output stages of the SLIC can actually output a current when the inversion is activated and whether this current has an inverted polarity (check on the actual inversion of the polarity, see section 3). In addition, the aforementioned second section of the inventive method tests the inversion of the internal, logical current direction in the CODEC. Furthermore, the above third section of the method examines the correct interplay of SLIC and CODEC in a subscriber line module SLM.

The invention claimed is:

1. A method for checking the function for inverting the polarity on a subscriber line, including a plurality of wires, for connecting at least one subscriber to a subscriber line module which has at least one inversion device and a current measuring device associated with the inversion device comprising:

isolating the subscriber line at least partially from the deactivated inversion device;

inverting the polarity on the subscriber line using a connected direct current source;
using the current measuring device to ascertain a first item of information representing the present direction of current flow on the subscriber line;
activating the inversion device;
using the current measuring device to ascertain a second item of information representing the present direction of current flow on the subscriber line;
isolating the direct current source from the subscriber line;
connecting the subscriber line to the activated inversion device;
using the current measuring device to ascertain a third item of information representing the present direction of current flow on the subscriber line; and
using the ascertained first, second and third items of information to check that the inversion is functioning.

2. The method as claimed in claim 1,
wherein comparison of the ascertained first and second items of information checks that the logical reversal of the internal current direction is functioning correctly in the subscriber line module.

3. The method as claimed in claim 1,
wherein comparison of the ascertained second and third items of information checks the proper inversion of the polarity on the wires of the subscriber line by the inversion device.

4. The method as claimed in
claim 1, wherein the direction of current flow on the subscriber line is ascertained by a current measuring instrument.

5. A device for checking the function for inverting the polarity on a subscriber line, comprising:
a plurality of wires, for connecting at least one subscriber to a subscriber line module which has at least one inversion device and a current measuring device associated with the inversion device;
an isolation device for at least partially isolating the subscriber line from the deactivated inversion device;
an inversion device for inverting the polarity on the subscriber line which comprise a direct current source connected to the subscriber line;
a first measuring device, comprising a current measuring device, for ascertaining a first item of information representing the present direction of current flow on the subscriber line;
an activation device for activating the inversion device;
a second measuring device, comprising a current measuring device, for ascertaining a second item of information representing the present direction of current flow on the subscriber line;
an isolation device for isolating the direct current source from the subscriber line;
a connection device for connecting the subscriber line to the activated inversion device;
a third measuring device, comprising a current measuring device, for ascertaining a third item of information representing the present direction of current flow on the subscriber line; and
a checking device for checking that the inversion is functioning using the ascertained first, second and third items of information.

6. The device as claimed in claim 5,
wherein the measuring device for ascertaining the first, second and third items of information representing the present direction of current flow on the subscriber line are the same device.

7. The device as claimed in claim 5,
wherein the checking device is formed such that the logical reversal of the internal current direction is ascertained to be functioning correctly in the subscriber line module by comparing the ascertained first and second items of information.

8. The device as claimed in
claim 5, wherein the checking device is formed such that the proper inversion of the polarity on the wires of the subscriber line by the inversion device is checked by comparing the ascertained second and third items of information.

9. The device as claimed in claim 5, wherein the measuring device for ascertaining the direction of current flow on the subscriber line are a current measuring instrument.

10. The device as claimed in
claim 5, wherein the subscriber line module comprises a subscriber line interface circuit and an encoder/decoder.

* * * * *